US007044782B2

(12) United States Patent
Enami et al.

(10) Patent No.: US 7,044,782 B2
(45) Date of Patent: May 16, 2006

(54) ELECTRICAL CONNECTOR

(75) Inventors: Yasuhiro Enami, Tokyo (JP); Akihiro Kodama, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 11/210,840

(22) Filed: Aug. 25, 2005

(65) Prior Publication Data

US 2006/0046563 A1 Mar. 2, 2006

(30) Foreign Application Priority Data

Aug. 31, 2004 (JP) ............................ 2004-251391

(51) Int. Cl.
*H01R 13/73* (2006.01)
*H02B 1/01* (2006.01)

(52) U.S. Cl. ........................ 439/564; 439/939; 439/607

(58) Field of Classification Search ................ 439/564, 439/607, 939
See application file for complete search history.

(56) References Cited

U.S. PATENT DOCUMENTS

| | | | | |
|---|---|---|---|---|
| 4,738,637 | A * | 4/1988 | Asick et al. | 439/610 |
| 5,603,639 | A * | 2/1997 | Lai et al. | 439/607 |
| 5,752,854 | A * | 5/1998 | Capp et al. | 439/607 |
| 6,033,263 | A * | 3/2000 | Weidler et al. | 439/620 |
| 6,074,222 | A * | 6/2000 | Kuo | 439/92 |
| 6,149,444 | A * | 11/2000 | Shi et al. | 439/95 |
| 6,206,728 | B1 * | 3/2001 | Krehbiel et al. | 439/607 |
| 6,210,216 | B1 * | 4/2001 | Tso-Chin et al. | 439/545 |
| 6,241,555 | B1 * | 6/2001 | Okuyama et al. | 439/607 |
| 6,361,365 | B1 * | 3/2002 | Yu | 439/607 |
| 6,364,706 | B1 * | 4/2002 | Ando et al. | 439/607 |
| 6,736,676 | B1 * | 5/2004 | Zhang et al. | 439/607 |

FOREIGN PATENT DOCUMENTS

JP 11-074028 3/1999

* cited by examiner

*Primary Examiner*—Tulsidas C. Patel
*Assistant Examiner*—Vladimir Imas
(74) *Attorney, Agent, or Firm*—Takeuchi&Kubotera, LLP

(57) ABSTRACT

An electrical connector includes a shield case for surrounding a contact portion of a terminal to be connected to a mating connector to be fitted in through an opening formed in a conductive front panel of an electrical device; and an attaching surface to be attached to a back surface of the front panel of the electrical device. The shield case has a cylindrical shape formed of a metal plate through bending. A housing includes the attaching surface and a receptacle portion recessed relative to the attaching surface. The shield case is retained in the receptacle portion. The shield case includes an elastic contact portion at a part thereof formed through bending. The elastic contact portion protrudes forward from a level of the attaching surface of the housing. When the electrical connector is attached to the front panel, the elastic contact portion elastically contacts with the front panel.

6 Claims, 4 Drawing Sheets

ELECTRICAL CONNECTOR

BACKGROUND OF THE INVENTION

The present invention relates to an electrical connector, especially an electrical connector having a shield member attached to an opening of a front panel of an electrical device.

Japanese Patent Publication No. 09-266028 has disclosed an electrical connector. As shown in FIGS. 4(A) and 4(B), the electrical connector includes a connector main body 51 holding a terminal and a shield case 52 with a bottomless inverted U shape for covering the connector main body 51. The shield case 52 includes extending portion 53 and leg portions 54 extending downwardly from sidewalls hereof. The extending portions bend at the right angle and hold a bottom surface of the connector main body 51 (FIG. 4(B)). The leg portions 54 enter corresponding holes of a circuit board and are fixed to the circuit board with solder. The shield case 52 includes contact pieces 55 as a part of an upper surface thereof for elastically contacting with a shield case of a mating connector.

The shield case 52 also includes a wall 56 bending upwardly in a direction perpendicular to the sidewalls and ear portions 57 bending toward sideways at a front surface thereof, i.e., an engaging surface relative to the mating connector. The ear portions 57 have holes and drawn portions drawn in a plate thickness direction around the holes to form screw holes 57A. The connector is attached to an opening of a front panel of an electrical device. The wall 56 and the ear portions 57 of the shield case 52 abut against a back surface of the front panel. Screws are inserted into the screw holes 57A to fix the connector from a side of the front panel.

Patent Reference 1: Japanese Patent Publication No. 09-266028

In the connector disclosed in Patent Reference 1, the ear portions 57 of the shield case 52 to be attached to the front panel are flush with the back surface of the front panel. The screw holes 57A of the ear portions 57 are drawn to increase rigidity. However, in Patent Reference 1, it is difficult to fix the connector to the front panel with the ear portions 57 for the following reasons.

First, the wall 56 and the ear portions 57 for regulating the position to be fixed to the front panel are formed through a process of bending the shield case 52. In a process of bending a metal plate, it is difficult to obtain high processing accuracy, especially a plane position. That is, it is difficult to position the wall 56 and the ear portions 57 exactly on a same plane. As a result, when the connector is fixed to the front panel, the connector tends to rattle.

Second, the wall 56 does not extend to a large extent, and the ear portions 57 are reinforced through the metal drawn process, thereby making the wall 56 and the ear portions 57 rigid. Accordingly, it is difficult to absorb the rattle through elasticity, so that the screws near the ear portions 57 are easy to become loose. On the other hand, if the screws are strongly tightened to obtain elasticity, an excessive stress may be caused in the ear portions and a surrounding area.

Further, the wall 56 and the ear portions 57 are formed to position on the same plane. Accordingly, they tend to move along the back surface of the front panel, thereby making it difficult to position them.

In view of the problems described above, an object of the present invention is to provide an electrical connector having a shield case, in which it is easy to accurately attach the electrical connector to a front panel. Further, it is possible to prevent a fixing screw from being loose.

Further objects and advantages of the invention will be apparent from the following description of the invention.

SUMMARY OF THE INVENTION

In order to attain the objects described above, according to the present invention, an electrical connector includes a shield case for surrounding a contact portion of a terminal to be connected to a mating connector to be fitted in through an opening formed in a conductive front panel of an electrical device; and an attaching surface to be attached to a back surface of the front panel of the electrical device.

In the electrical connector of the present invention, the shield case has a cylindrical shape formed of a metal plate through bending. A housing includes the attaching surface and a receptacle portion recessed relative to the attaching surface. The shield case is retained in the receptacle portion. The shield case includes an elastic contact portion at a part thereof formed through bending. The elastic contact portion protrudes forward from a level of the attaching surface of the housing. When the electrical connector is attached to the front panel, the elastic contact portion elastically contacts with the front panel.

According to the present invention, the attaching surface of the electrical connector is formed of a resin as a part of a surface of the housing, thereby obtaining good flatness and accuracy. Accordingly, the attaching surface can uniformly contact with the back surface of the front panel of the electrical device. When the electrical connector is attached to the front panel, the elastic contact portion protruding from the attaching surface elastically deforms up to a plane having a level same as the attaching surface with a pressing force against the front panel. Accordingly, the attaching surface of the housing thoroughly contacts with the back surface of the front panel. Further, an elastic force is generated between the electrical connector and the front panel through the elastic deformation of the elastic contact portion. As a result, it is possible to prevent the connector attached to the front panel from being loose.

According to the present invention, the electrical connector may have a terminal held with the housing. The terminal includes a contact portion situated in the shield case.

According to the present invention, the housing may include a screw hole for engaging a fixing screw to be inserted into a hole of the front panel, so that the electrical connector is fixed to the front panel with the fixing screw. The screw hole may be formed of a nut assembled in the housing. By providing the nut, it is possible to increase strength around the screw hole, thereby making it possible to repeatedly use the fixing screw.

According to the present invention, the housing may include a groove portion or a cut portion in the attaching surface for allowing the elastic contact portion to elastically deform upon contacting with the front panel.

According to the present invention, the shield case may protrude forward from the attaching surface of the housing and be retained in the receptacle portion, so that the protruding portion of the shield case protruding from the attaching surface is inserted into the opening of the front panel. Accordingly, when the electrical connector is attached to the front panel, it is possible to accurately and easily position the electrical connector relative to the front panel, thereby making it easy to attach.

As described above, according to the present invention, the attaching surface is provided as the front surface of the housing. The elastic contact portion protrudes from the attaching surface as a part of the shield case. Accordingly, it is possible to accurately define the fixing position with the attaching surface accurately molded through resin molding. The elastic contact portion, i.e., a part of the shield case, elastically contacts with the front panel, thereby obtaining secure contact between them for grounding. Further, it is possible to absorb rattle and prevent the screw from being loose. Accordingly, it is possible to obtain stable performance of the electrical device with the electrical connector in long time use.

BRIEF DESCRIPTION OF THE DRAWINGS

FIGS. 2(A) and 2(B) are perspective views of the electrical connector shown in FIG. 1, wherein FIG. 2(A) is a view showing a shield case and FIG. 2(B) is a view showing the electrical connector with the shield case assembled therein;

FIGS. 4(A) and 4(B) are views showing a shield case of a conventional electrical connector, wherein FIG. 4(A) is a plan view thereof and FIG. 4(B) is a front view thereof.

DETAILED DESCRIPTION OF THE PREFERRED EMBODIMENTS

Figure 1:
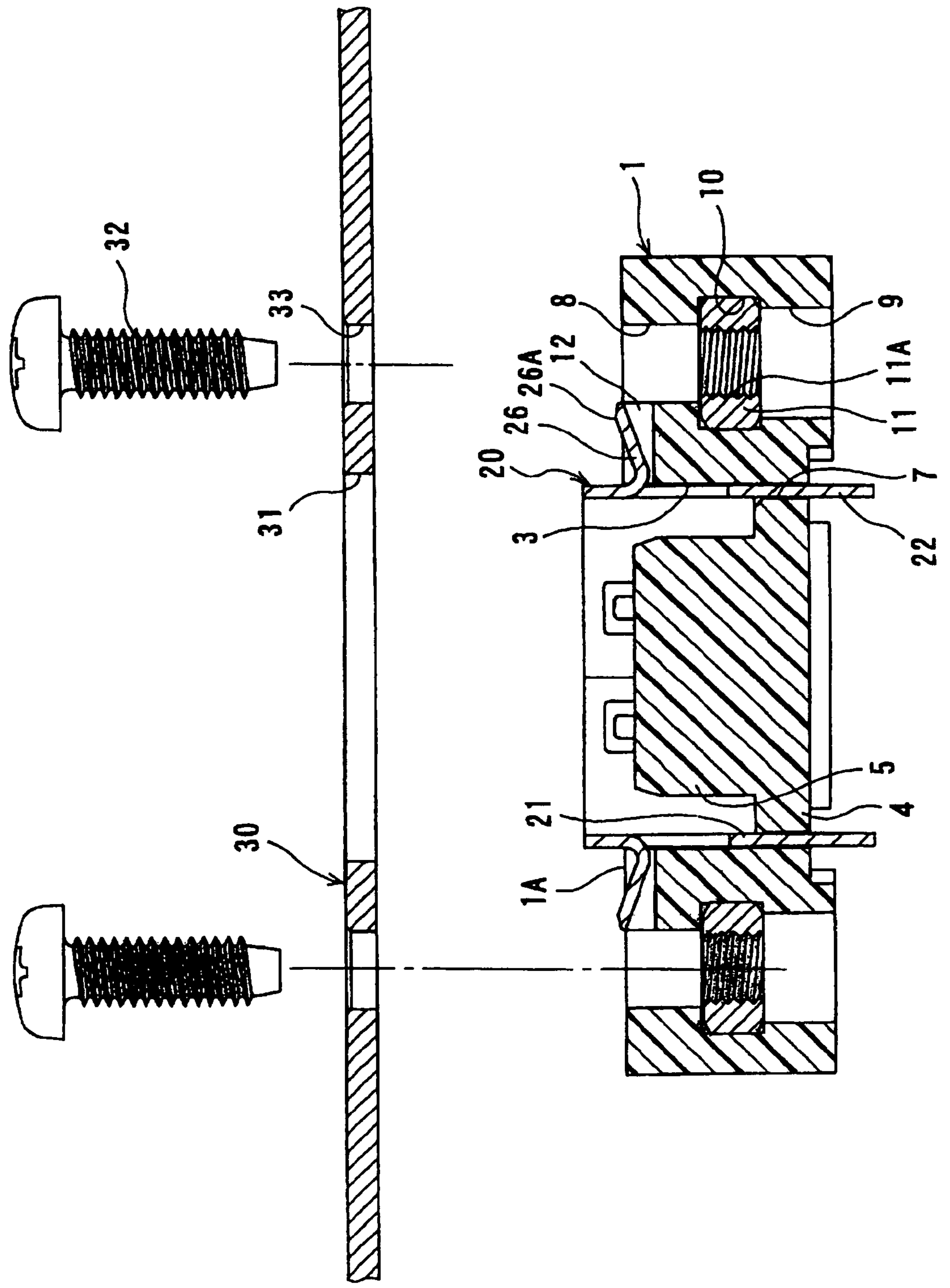
FIG. 1 is a sectional view showing an electrical connector according to an embodiment of the present invention in a state before the electrical connector is attached to a front panel of an electrical device.
Figure 2A:
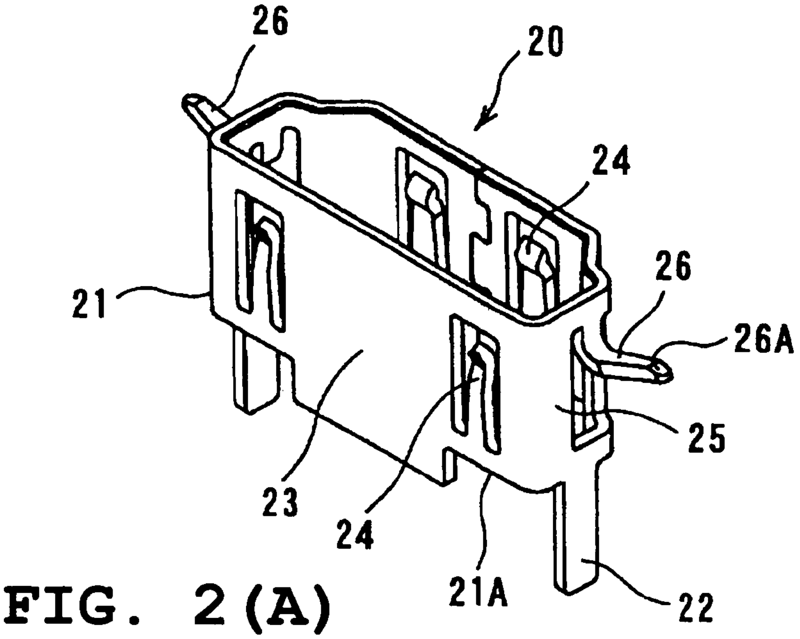
Figure 2B:
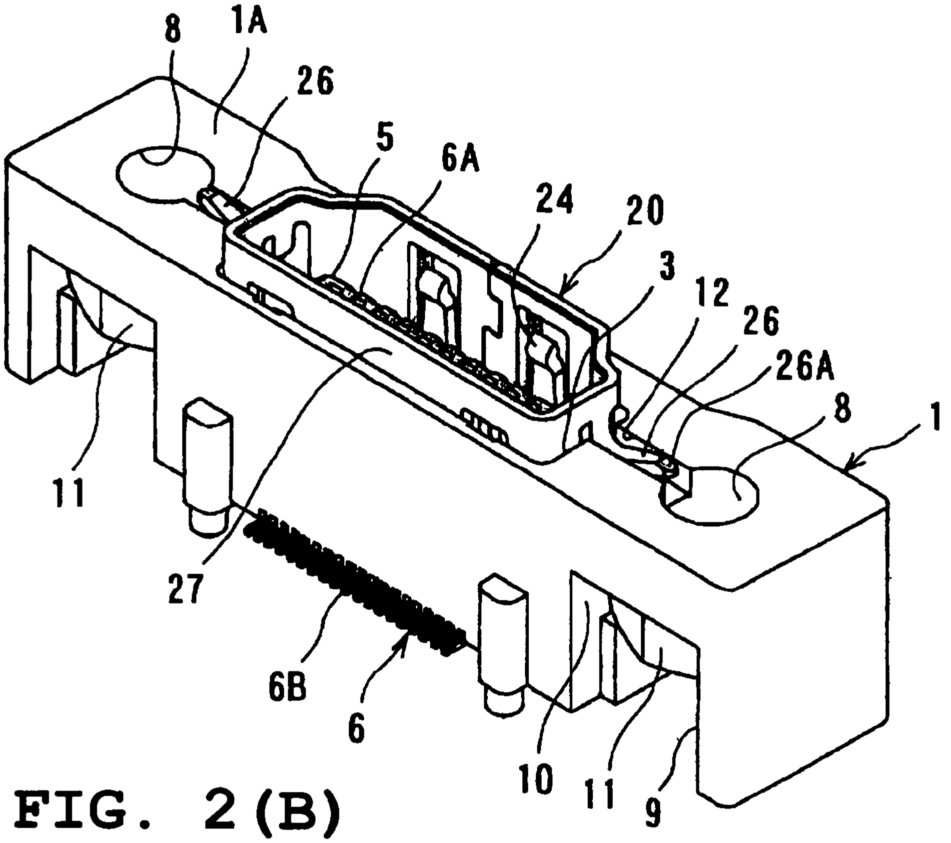
Figure 3:
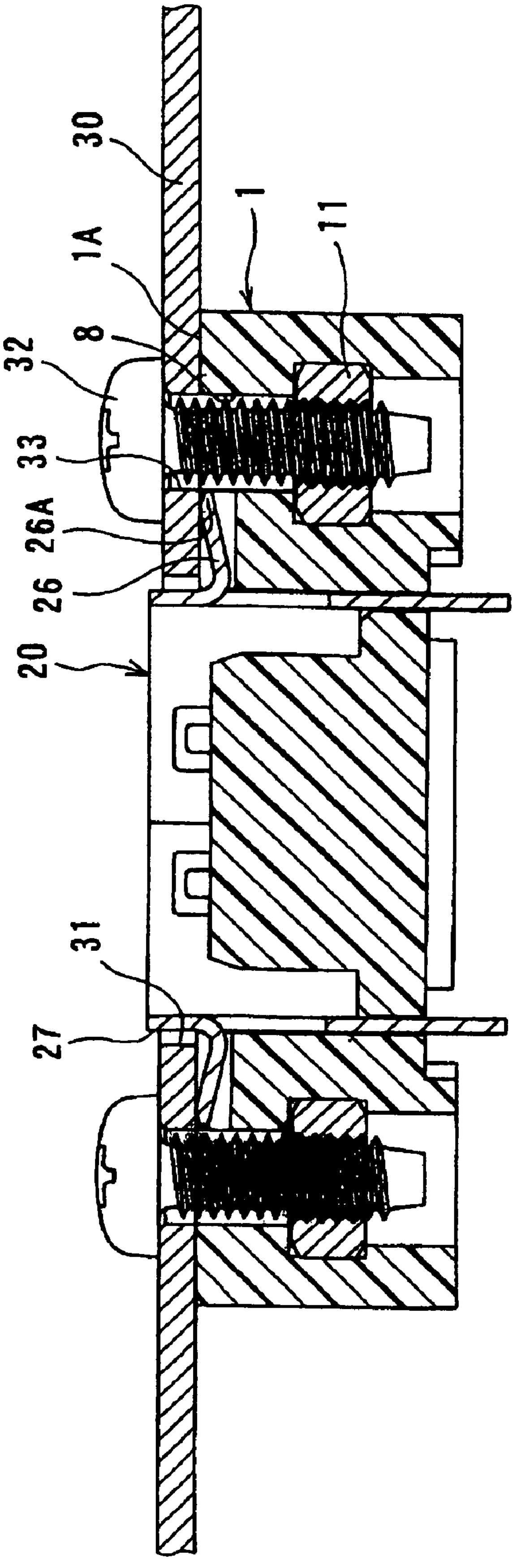
FIG. 3 is a view showing the electrical connector shown in FIG. 1 in a state that the electrical connector is attached to the front panel.
Figure 4A:
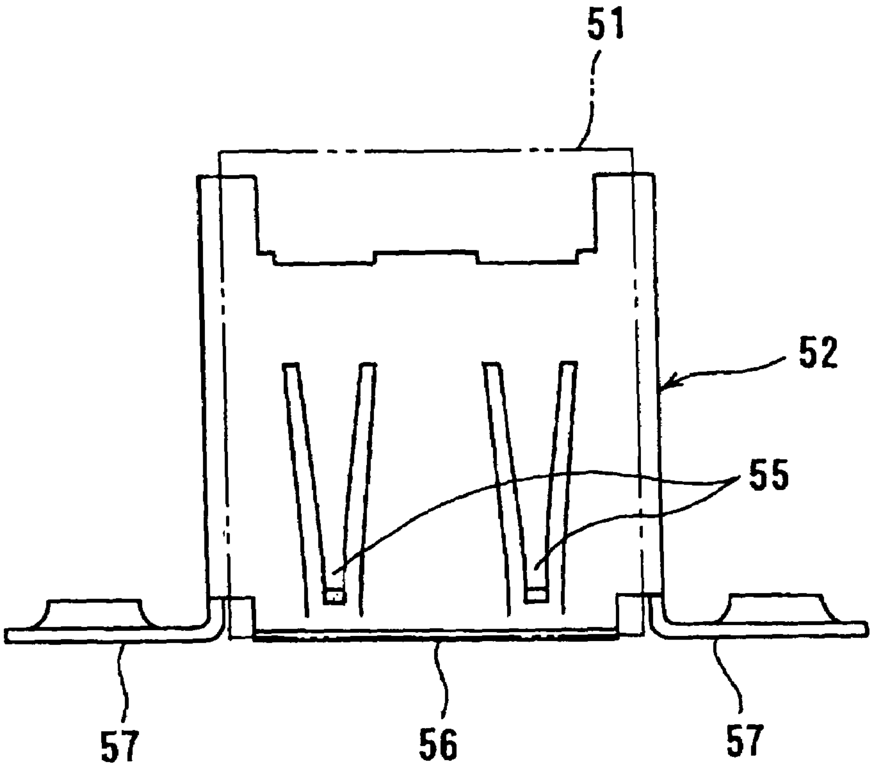
Figure 4B:
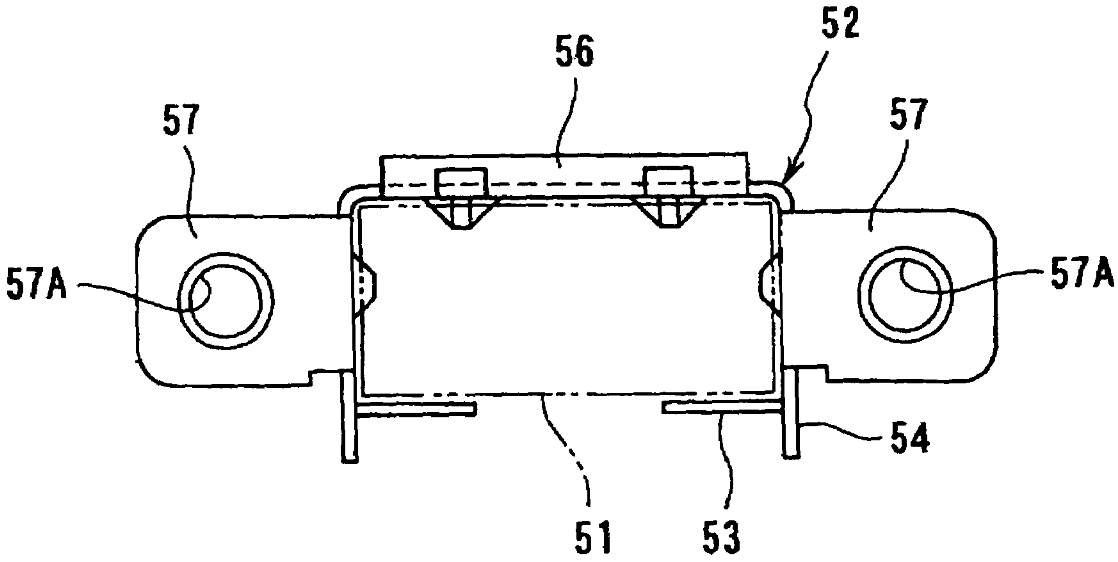

Hereunder, embodiments of the present invention will be explained with reference to the accompanying drawings. FIG. 1 is a sectional view showing an electrical connector according to an embodiment of the present invention in a state before the electrical connector is attached to a front panel of an electrical device. FIGS. 2(A) and 2(B) are perspective views of the electrical connector shown in FIG. 1, wherein FIG. 2(A) is a view showing a shield case and FIG. 2(B) is a view showing the electrical connector with the shield case assembled therein. FIG. 3 is a sectional view showing the electrical connector shown in FIG. 1 in a state that the electrical connector is attached to the front panel.

As shown in FIGS. 1, 2(A) and 2(B), the electrical connector includes a housing 1 having a symmetrical shape and formed of an insulating material such as a synthetic resin; and a metal shield case 20 retained in a receptacle portion 3 of the housing 1. The housing 1 has a rectangular outer shape, and includes a flat attaching surface 1A at a front surface (an upper surface in FIG. 2(B)). The receptacle portion 3 (described later) has an opening in the attaching surface 1A.

The receptacle portion 3 is formed at the middle of the housing 1 in a width direction (a lateral direction in FIG. 1) for receiving the shield case 20. An arranging portion 5 with a plate shape is disposed in the receptacle portion 3, and protrudes upwardly from a bottom wall 4 of the receptacle portion 3. Contact portions 6A are arranged on both surfaces of the arranging portion 5 as one ends of a plurality of terminals 6 (FIG. 2(B)). Connecting portions 6B as the other ends of the terminals 6 protrude from one of the sidewalls in a bent shape at a bottom of the housing 1. A slit 7 is formed in a bottom wall 4 of the housing 1 along the width direction of the electrical connector, and passes through toward a lower side. A leg portion of the shield case 20 is inserted into the slit 7.

Holes 8 are formed in an upper surface of the housing 1 at positions on both sides in the width direction, and communicate with spaces 9 formed at a lower portion of the housing 1. The space 9 has openings at a lower side and both sides of the housing 1. Side recess portions 10 with a step shape are formed at boundaries between the spaces 9 and the holes 8, and extend toward sides of the housing 1. Nuts 11 with female screw portions 11A are fitted in the side recess portions 10. The nuts are formed of a metal having high strength, and the female screw portions may be formed directly in the housing without the nuts. Groove portions 12 are formed in the upper surface of the housing 1 and opened upwardly for communicating with the receptacle portion 3 and the holes 8.

As shown in FIG. 2(A), the shield case 20 is formed of a metal plate through a bending process, and has a rectangular column shape fitted in the receptacle portion 3 of the housing 1. In the shield case 20, leg portions 22 extend downwardly from lower edges 21A of a rectangular column main body 21. Elastic contact pieces 24 cut with rectangular grooves are formed in sidewall portions 23 extending in a width direction, and have distal ends curved inwardly. Elastic contact portions 26 cut with rectangular grooves are formed in end walls 25 at ends in the width direction. The elastic contact portions 26 are greatly curved relative to the end walls 25, and are inclined upwardly toward distal ends 26A thereof.

In the shield case 20, the main body 21 has a height larger than a depth of the receptacle portion 3 of the housing 1. When the shield case 20 is inserted into the receptacle portion 3, as shown in FIG. 1 and FIG. 2(B), an upper end portion of the main body 21 protrude from the attaching surface 1A of the housing 1 to form a protruding portion 27. When the main body 21 of the shield case 20 is retained in the receptacle portion 3, as shown in FIG. 1, the elastic contact portions 26 are retained in the groove portions 12 of the housing 1, and the distal ends 26A of the elastic contact portions 26 protrude from the level of the attaching surface 1A of the housing 1. The elastic contact portions may be formed with a method other than cutting and bending.

As shown in FIG. 1, a front panel 30 is attached to the electrical connector, and constitutes a part of a housing of an electrical device. An opening 31 with a window shape is provided for receiving the protruding portion 27 of the shield case 20 (FIG. 2(B)). Holes 33 are formed at both sides of the opening 31 for inserting screws 32 at locations corresponding to the nuts 11 of the electrical connector when the protruding portion 27 is inserted into the opening 31. The front panel is generally formed of a metal plate. When the front panel is made of a material other than metal, portions contacting with the elastic contact portions of the shield case are made conductive.

In the present embodiment, the electrical connector is assembled as follows. First, the nuts 11 are attached to the housing 1 holding the terminals 6. The nuts 11 are pushed into the side recess portions 10 of the housing 1 sideways (in a direction perpendicular to the sheet of FIG. 1).

Next, the shield case 20 is press-fitted in the receptacle portion 3 of the housing 1 from above. The lower edges 21A of the main body 21 abut against the bottom surface of the receptacle portion 3, so that the shield case 20 is positioned at a specific depth. In this state, the leg portions 22 of the shield case 20 protrude downwardly from the slit 7 at the bottom of the housing, and the elastic contact portions 26 are retained in the groove portions 12. At this time, as shown in FIG. 1, the protruding portion 27, i.e., the upper end portion of the main body 21 of the shield case 20, and the distal ends

26A of the elastic contact portions 26 protrude above the attaching surface 1A of the housing 1.

Afterward, the electrical connector is attached to the circuit board (not shown), so that the terminals 6 are connected to a corresponding circuit of the circuit board. In this connecting process, after the leg portions 22 of the shield case 20 are inserted into corresponding holes of the circuit board, the terminals are soldered to the circuit board. Accordingly, the connecting portions 6B of the terminals 6 are soldered to the corresponding circuit in an abutting state.

Then, the electrical connector is attached to the back surface of the front panel 30 of the electrical device. In this process, the protruding portion 27, i.e., the upper end portion of the main body 21 of the shield case 20, is inserted into the opening 31 of the receptacle portion 3 to define the attaching position. The screws 31 pass through the holes 33 from a front side, and are screwed into the nuts 11 disposed at the backside of the holes 8 of the connector. When the screws 32 are tightened, the distal ends 26A of the elastic contact portions 26 of the shield case 20 elastically contact with the back surface of the front panel 30 and deform, thereby entering into the groove portions 12 of the housing 1. Accordingly, the attaching surface 1A of the housing 1 thoroughly contacts with the back surface of the front panel 30. As a result, the connector is stably fixed at the precise location with the attaching surface 1A of the housing 1, and an elastic force of the elastic contact portions 26 is generated relative to the front panel 30.

After the connector is attached as described above, a mating connector (not shown) is inserted from the opening of the shield case 20, so that the elastic contact pieces 24 of the shield case 20 contact with a shield case of the mating connector. Accordingly, both connectors are electrically connected through the terminals, and the shield cases thereof are also electrically connected.

The invention is not limited to the embodiments described above, and various modifications are possible. For example, the shield case is not limited to the rectangular column shape, and may be a cylindrical shape. The shield case may not be opened in the circumferential direction, and may be opened just a part thereof. In this case, when a mating connector is attached, the circumferential direction is closed with both shield cases. Further, the number and shape of the elastic contact portions contacting the front panel are not limited to the embodiments.

The disclosure of Japanese Patent Application No. 2004-251391, filed on Aug. 31, 2004, is incorporated in the application.

While the invention has been explained with reference to the specific embodiments of the invention, the explanation is illustrative and the invention is limited only by the appended claims.

What is claimed is:

1. An electrical connector to be attached to a panel of an electrical device for connecting a mating connector, comprising:

a housing having an attaching surface to be attached to the panel and a receptacle portion recessed relative to the attaching surface;

a terminal disposed in the housing for contacting with a corresponding terminal of the mating connector; and a shield case retained in the receptacle portion for surrounding the terminal, said shield case including an elastic contact portion protruding from the attaching surface so that the elastic contact portion elastically contacts with the panel when the electrical connector is attached to the panel, wherein said housing further includes one of a groove portion and a cut portion in the attaching surface for allowing the elastic contact portion to elastically deform upon contacting with the panel.

2. The electrical connector according to claim 1, wherein said shield case has a rectangular column shape and is formed of a metal plate.

3. The electrical connector according to claim 1, wherein said terminal includes a contact portion situated in the shield case.

4. The electrical connector according to claim 1, wherein said housing further includes a screw hole for engaging a fixing screw to be inserted into a hole of the panel.

5. The electrical connector according to claim 4, wherein said screw hole may be formed of a nut assembled in the housing.

6. The electrical connector according to claim 1, wherein said shield case further includes a protruding portion protruding from the attaching surface so that the protruding portion is inserted into an opening of the panel.

* * * * *